(No Model.)
R. C. McCLARRAN.
POTATO BUG CATCHER.
No. 598,532. Patented Feb. 8, 1898.
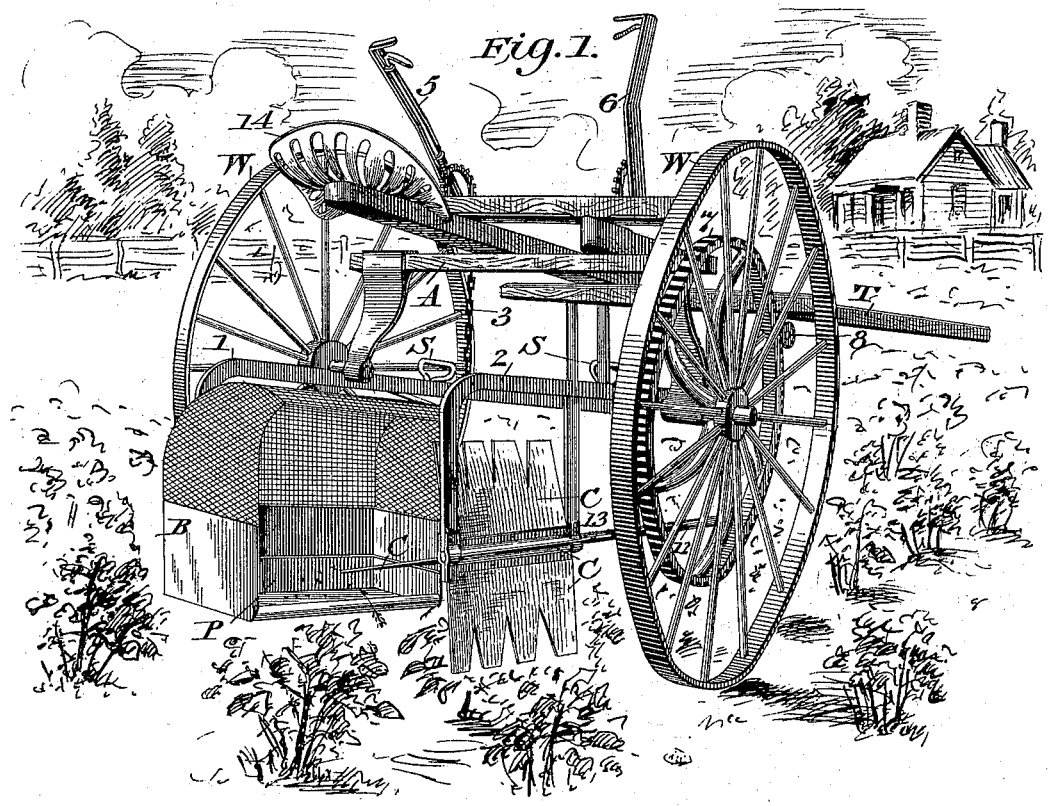
Fig. 1.
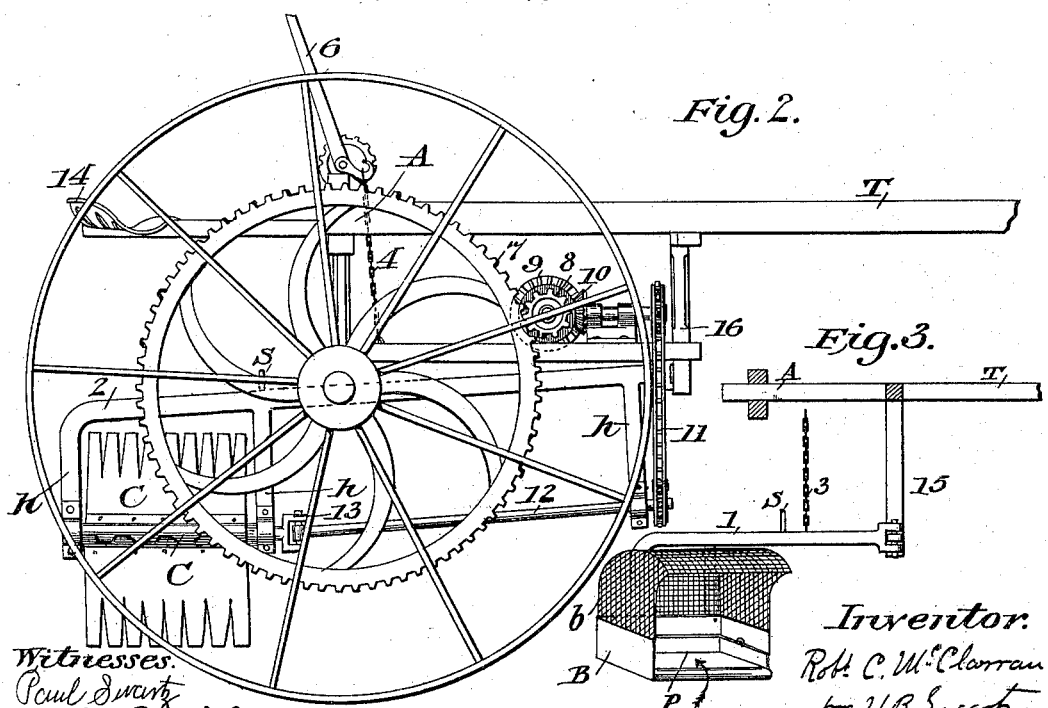
Fig. 2.
Fig. 3.
Witnesses.
Paul Swartz
J. E. Proctor
Inventor.
Robt. C. McClarran
per H. B. Swartz
Atty.
THE NORRIS PETERS CO., PHOTO-LITHO., WASHINGTON, D. C.

UNITED STATES PATENT OFFICE.

ROBERT C. McCLARRAN, OF WOOSTER, OHIO.

POTATO-BUG CATCHER.

SPECIFICATION forming part of Letters Patent No. 598,532, dated February 8, 1898.

Application filed November 3, 1897. Serial No. 657,299. (No model.)

*To all whom it may concern:*

Be it known that I, ROBERT C. MCCLARRAN, a citizen of the United States, residing at Wooster, in the county of Wayne and State of Ohio, have invented a new and useful Potato-Bug Catcher, of which the following is a specification.

My invention relates to machines for removing potato-bugs and the like from growing vines.

It consists of the novel mechanism and combination of parts, as hereinafter fully set forth, and illustrated in the accompanying drawings, in which similar letters and figures of reference indicate like parts.

Referring to the drawings, Figure 1 is a rear view of a machine embodying my invention. Fig. 2 is a side view of the same, showing the operating mechanism. Fig. 3 is a detached view of the bug-receptacle.

My invention is preferably mounted upon a sulky similar to a common cultivator-sulky, with wheels W W, tongue T, axle-frame A, and seat 14.

Under the forward part of the frame and on opposite sides of the same swing-bars 1 2 are suspended by supports 15 16, respectively, and to which their inner ends are pivotally connected, as shown, Fig. 3. The outer ends of the swing-bars are free to swing laterally by foot-pressure applied at the stirrups s s, and are also adjustably secured vertically by lifts 3 4, by means of ratchet-levers 5 6, respectively, in the usual well-known way.

From swing-bar 1 depends the receptacle or bug-pan B, Fig. 3, preferably made of sheet metal. It is open on the side adjacent to the brush-wheel C and is provided with an awning-cover *b* of netting to prevent the bugs from being thrown over the pan by the action of the brush-wheel. The forward part of the pan is made somewhat boat-shaped to better pass the row of vines, and the upper edge adjacent to the brush-wheel is bent inwardly to prevent the escape of the bugs, and a removable pan *p* is fitted to the bottom of receptacle B to be lifted out for emptying the same.

From swing-bar 2 depends a cylindrical brush-wheel C, Fig. 2, mounted in suitable bearings on hangers *h h h* and adapted to be rotated upwardly against the vines by means of cog-gear 7 8 9 10, sprocket-chain 11, shaft 12, broken by the universal joint 13, or any other equivalent gear. The brush-wheel is preferably made by fastening strips of leather to a central core, but may be made of any other suitable flexible material.

The operation of the machine is simple and easy. The operator, seated on seat 14, with feet in stirrups *s s*, thereby controls the lateral movements of the swing-bars 1 2, so as to keep the brush-wheel and bug-pan, respectively, in the desired proximity to the row of vines on the opposite sides of the same, and the altitude of each of said members may be regulated by levers 5 6, respectively, so as to cause the bugs by the action of the brush-wheel against the vines to fall in the direction of the arrow into the open side of the pan, as aforesaid.

I am aware that the sulky, the swing-bars, and means of operating and adjusting the same are not new, and such I do not claim, and I do not limit my invention to the particular method of constructing and operating the same as shown, as it is apparent that other equivalent means may be substituted to rotate the brush-wheel against the row of vines and suspend the receptacle opposite thereto for the purpose stated.

Having thus fully described my invention, what I claim as new, and desire to secure by Letters Patent, is—

The combination with a wheeled vehicle, having dependent swing-bars 1, 2, vertically and laterally adjustable, of a brush-wheel, C, depending from one of said swing-bars, by suitable hangers and bearings, and geared to rotate against the vines—the operating-shaft of brush-wheel adapted to swing with the swing-bar and rotate by cog-gear, 7, 8, 9, 10, and a receptacle B for bugs depending from said other swing-bar, and opening adjacent to said brush-wheel, substantially as shown, and for the purpose specified.

In witness whereof I hereunto set my hand this 31st day of August, 1897.

ROBT. C. McCLARRAN.

In presence of—
  HIRAM B. SWARTZ,
  PAUL SWARTZ.